(12) United States Patent
Koga et al.

(10) Patent No.: US 6,678,966 B1
(45) Date of Patent: *Jan. 20, 2004

(54) RESEAT SYSTEM OF TOUCH SIGNAL PROBE

(75) Inventors: Satoshi Koga, Tsukuba (JP); Nobuhisa Nishioki, Tsukuba (JP)

(73) Assignee: Mitutoyo Corporation, Kanagawa (JP)

( * ) Notice: Subject to any disclaimer, the term of this patent is extended or adjusted under 35 U.S.C. 154(b) by 657 days.

This patent is subject to a terminal disclaimer.

(21) Appl. No.: 09/596,107

(22) Filed: Jun. 16, 2000

(30) Foreign Application Priority Data

Jun. 16, 1999 (JP) .............................. 11-169713

(51) Int. Cl.7 .................................................. G01B 7/00
(52) U.S. Cl. ............................................ 33/558; 33/561
(58) Field of Search ........................... 33/558, 556, 557, 33/559, 560, 561

(56) References Cited

U.S. PATENT DOCUMENTS

| | | | | |
|---|---|---|---|---|
| 4,859,817 A | | 8/1989 | Cassani ........................ 33/561 |
| 5,756,886 A | * | 5/1998 | Nishimura et al. ........... 33/558 |
| 5,918,378 A | * | 7/1999 | McMurtry et al. ............ 33/556 |
| 6,523,273 B1 | * | 2/2003 | Nishioki et al. .............. 33/559 |

FOREIGN PATENT DOCUMENTS

| | | |
|---|---|---|
| EP | 0654651 | 5/1995 |
| EP | 0764827 | 9/1996 |

\* cited by examiner

*Primary Examiner*—Christopher W. Fulton
(74) *Attorney, Agent, or Firm*—Webb Ziesenheim Logsdon Orkin & Hanson, P.C.

(57) ABSTRACT

A reseat system of a touch signal probe includes a fixed component, a movable component, a pair of hard balls provided on the fixed component, a cylindrical body provided on the movable component for abutting the hard balls, and a piezoelectric element for relatively sliding the hard balls and the cylindrical body. Since an outer circumference of the cylindrical body has conic shape, both a contact point on the cylindrical body and a contact point on a hard ball change position thereof during relative slide movement.

11 Claims, 8 Drawing Sheets

RESEAT SYSTEM OF TOUCH SIGNAL PROBE

BACKGROUND OF THE INVENTION

1. Field of the Invention

The present invention relates to a reseat system of a touch signal probe installed in a coordinates measuring machine. More specifically, it relates to a reseat system of a touch signal probe having a fixed component and a movable component, the reseat system allowing displacement of the movable component relative to the fixed component when a force is applied to the movable component from the outside and accurately returning the movable component to a rest position when the force applied to the movable component ceases to exist.

2. Description of Related Art

A touch signal probe is used in a coordinates measuring machine for detecting contact. In the coordinates measuring machine having the touch signal probe, a probe movable in three-dimensional directions touches a workpiece on a fixed table and a coordinate value of respective axes (respective axes in the three-dimensional directions) when the probe touches the workpiece is read as an electric trigger, so that dimensions and configuration of the workpiece are measured based on the coordinate values. Accordingly, a position of the probe can be detected by an electric touch signal based on contact between the probe and the workpiece.

FIG. 5 shows a conventional touch signal probe. In the figure, a stylus 1 is fixed to a movable component 2. A contact ball 4 is provided at a distal end of the stylus 1. Three cylindrical bodies 3 radially projecs with 120 degree intervals around an axis of the stylus 1 from a periphery of the movable component 2 on a plane perpendicular to the axis of the stylus 1. On the other hand, the fixed component 5 has three pairs of cylindrical bodies 6 at positions corresponding to cylindrical bodies 3 of the movable component 2. The cylindrical bodies 3 and the cylindrical body 6 constitute a reseat component for defining the relative position of the fixed component 5 and the movable component 2 at one place.

According to the above arrangement, the movable component 2 is pressed to the fixed component 5 by virtue of a biasing force F of a biasing component (not shown) and the movable component 2 is forcibly brought into contact with the fixed component 5 through the reseat component. When the pressing force from the workpiece is not applied to the distal end of the stylus 1, the movable component 2 rests on the fixed component at six contact points. In other words, respective cylindrical bodies 3 of the movable component 2 rest on the respective cylindrical bodies 6 at two points for a total of six points. Accordingly, the reseat system is called as a six-point contact reseat system.

According to the six-point contact reseat system, the reseat position of the movable component after an escape movement can be located at only one place. In other words, assuming that the stylus 1 displaces parallel to axial direction at the rest position of the stylus 1 while maintaining contact between the reseat component on the movable component side and the reseat component on the fixed component side at the respective contact points, the respective loci drawn by the distal end of the stylus crosses the axis of the stylus at the rest position. According to the arrangement, the stylus 1 returns to a unique rest position only by restoring contact with the respective contact points by the biasing force F during return movement after an escape movement of the movable component 2 by the pressing force from the workpiece, so that the rest position of the stylus 2 can be kept constant.

Since the position of the movable component relative to the fixed component can be set unique by the six-point contact reseat system, the six-point contact reseat system has high anti-vibration rigidity. Further, irrespective of the direction of the outside pressing force, the six-point contact reseat system has high reseat ability in a relatively rough unit of, for instance, 10 $\mu$m.

However, the above-described six-point contact reseat system causes an error ("reseat shift error") in a further fine unit of, for instance, 1 $\mu$m observed in return movement after contact, the error being caused because the movable component is pushed by the workpiece during escape movement of the movable component to cause displacement relative to the fixed component.

Specifically, as shown in FIG. 6(A), when the contact ball 4 touches the workpiece W in the conventional reseat system, the stylus 1 moves in the left direction in the figure as shown in FIG. 6(B). At this time, a small reaction force is caused between the movable component 2 and the fixed component 5, so that the movable component 2 slightly slides in the left direction in the figure. When the workpiece W and the stylus 1 connected to the movable component 2 are no more in contact with each other as shown in FIG. 6(C), the movable component 2 conducts the return movement by virtue of the biasing force F, where the axial position of the movable component 2 is shifted on account of the aforesaid slide movement. The shift directly affects on measurement accuracy of the probe.

The Applicants of the present invention have proposed a reseat system capable of correcting reseat position shift after return movement shown in FIG. 7 (European Patent Publication No. 0764827 A2), where the reseat error is corrected by a piezoelectric element for administrating the direction of the friction force applied to a contact point between the movable component and the fixed component of the reseat system.

The reseat system has a fixed component 11, a movable component 21 and a biasing force generator (not shown) capable of allowing displacement of the movable component 21 relative to the fixed component 11 when a force is applied to the movable component from the outside and capable of returning the movable component 21 to a rest position when the force is not applied to the movable component 21.

The movable component 21 has a stylus 22 having a contact ball 24 to be in contact with the workpiece projecting therefrom and three cylindrical bodies 23 extending radially around the axis of the stylus 22 at 120 degree intervals to be in contact with the fixed component 11.

A central portion of the fixed component 11 is secured to a housing of the probe (not shown), the fixed component 11 having three arms 12 extending radially around the axis of the stylus 22 at 120 degree intervals. A pair of hard balls 13 is disposed on an upper surface of an end of the respective arms 12.

Further, a piezoelectric element 14 as a displacement generator is provided on an inner portion relative to the hard balls 13 of the respective arms 12, the piezoelectric elements being stretchable radially approximately along the axis of the stylus 22.

When a voltage is applied to the respective piezoelectric elements 14, the respective piezoelectric elements 14 synchronously displace, so that the respective hard balls 13 displace in approximately radial direction around the axis of the stylus 22. Incidentally, the displacement in the present arrangement is a kind of "static" displacement, which is different from vibration where the movement of the piezoelectric elements is minutely repeated.

The direction of the friction force at respective contact points between the cylindrical body 23 and the hard ball 13 aligns by the displacement, so that the reseat position can be adjusted to return the movable component by the biasing force.

However, in the above-described mechanism, though "axial shift", i.e., the reseat shift error in axial direction of the cylindrical body 23 can be effectively corrected, "circumferential error", i.e., the reseat shift error in a circumferential direction around the axis of the stylus 22 cannot be sufficiently corrected.

Specifically, as shown in FIGS. 8(A) (seen from an upper direction in FIG. 7) and 8(B) (seen from an outside on the axis of the cylindrical body 23), when the movable component 21 conducts the return movement after the stylus 22 touches the workpiece, the cylindrical body 23 can be shifted in the circumferential direction around the axis of the stylus 22 to be supported by only one of the hard balls 13. When the cylindrical body 23 is displaced in the axial direction while being shifted in the circumferential direction, the cylindrical body 23 slides in the axial direction while keeping shifted in the circumferential direction as shown in FIGS. 8(C) to (H), so that the circumferential shift cannot be sufficiently eliminated.

The above phenomenon is thought to be caused because the effect of the biasing force for eliminating the circumferential direction is blocked by strain energy on a surface of the hard balls 13.

Specifically, minute elastic deformation is generated at the contact point P1 between the cylindrical body 23 as the reseat component on the movable component side and the hard ball 13 as the reseat component on the fixed component side on both the cylindrical body 23 side and the hard ball 13 side. Immediately after the stylus 22 is no more in contact with the workpiece and the movable component 21 conducts the return movement, there is dispersion in the direction of the elastic deformation at respective contact points P1$a$ and P1$b$ between the cylindrical body 23 as the reseat component on the movable component side and the hard ball 13 as the reseat component on the fixed component side and the force applied to the respective contact point. Though slightly, the elastically deformed portion receives relative slide of the movable component 21 and the fixed component 11, thus blocking return movement by the biasing force.

When displacement voltage is synchronously applied to the respective piezoelectric elements 14, the respective hard balls 13 move to project and retreat in a direction radial to the axis of the stylus 22 relative to the rest position thereof. Accordingly, the cylindrical body 23 temporarily slides in an axial direction relative to the hard ball 13. And the contact point on the cylindrical body 23 sequentially moves from P1$a$ in FIG. 8(A) to P2 in FIG. 8(C), P3 in FIG. 8(E) and P4 in FIG. 8(G). Therefore, the direction of the elastic deformation at the contact points and the force applied to the contact point can be leveled on the cylindrical body 23 side, thus eliminating the axial shift.

However, as shown in FIGS. 8(B), 8(D), 8(F) and 8(H), the contact point P1$b$ on the hard ball 23 stays at one point irrespective of the slide of the cylindrical body 23, and the elastic deformation cannot be leveled. Accordingly, the strain energy for preventing the cylindrical body 23 from returning in the circumferential direction still works on the contact point P1$b$ on the hard ball 23 side, which is thought to be a reason for the circumferential shift not to be eliminated. Since the circumferential shift still remains, the reseat shift cannot be corrected with extremely high accuracy.

SUMMARY OF THE INVENTION

An object of the present invention is to provide a reseat system of a touch signal probe capable of highly accurately correcting reseat shift error after the return movement of the movable component.

A reseat system of a touch signal probe according to the present invention includes: a fixed component; a movable component having a stylus; a first reseat component provided on the fixed component; a second reseat component provided on the movable component, the second reseat component touching the first reseat component at a pair of contact points on three locations mutually spaced apart, the reseat system of a touch signal probe allowing displacement of the movable component relative to the fixed component when outside force is applied to the stylus and returning the movable component to a rest position when the outside force is not applied to the stylus by virtue of a biasing force; and a contact point displacer for changing both of the contact point on the fixed component and the contact point on the movable component for at least a predetermined distance.

According to the present invention, during return movement of the movable component, both of the contact point on the fixed component and the contact point on the movable component change position thereof. Accordingly, neither one of the contact point on the fixed component or the contact point on the movable component keeps elastic deformation during displacement as contrary to the conventional arrangement, so that the strain energy by the elastic deformation is eliminated by the displacement. Therefore, a force for preventing return to the rest position does not work on any one of the contact points on the fixed component and the movable component, so that the reseat shift error can be effectively corrected.

In the above-described reseat system of a touch signal probe, the predetermined distance may preferably be larger than the Hertzian elastic deformation caused on the contact points on the fixed component and the movable component.

Accordingly, since the amount of movement of both of the contact points on the fixed component and the movable component exceeds the Hertzian elastic deformation, the strain energy can be sufficiently eliminated by the elastic deformation, so that shift correction function can be effectively performed.

In the above arrangement, the contact point displacer may preferably include: a curved surface formed on one of the first reseat component and the second reseat component; a slant surface formed on the other of the first reseat component and the second reseat component, the slant surface slanting relative to a radial direction of an axis of the stylus; and a drive source for relatively displacing the first reseat component and the second reseat component.

According to the present arrangement, both positions of both of the contact points on the movable component and the fixed component can be changed by a single drive source. Therefore, the construction of the reseat system can be simplified.

Specifically, the first reseat component or the second reseat component may preferably be a pair of hard balls and the other may preferably be a cylindrical body having conic outer circumference.

Alternatively, the first reseat component or the second reseat component may preferably be a pair of cylindrical bodies arranged in a V-shape and the other may preferably be a cylindrical body having a conic outer circumference.

Further alternatively, the first reseat component or the second reseat component may preferably be one hard ball and the other may preferably be a V-shape groove having a cut surface slanting relative to the radial direction of the axis of the stylus.

According to the above configuration, the present invention can be achieved by only changing a part of a component of the conventional reseat system. Therefore, the conventional production facility, product parts and production process can be applied to the production of the present invention, thus avoiding significant increase in the production costs. Further, a component having high accuracy can be easily manufactured, thereby easily implementing the effect of the present invention.

In the above, the contact point displacer may preferably include a displacement generator for relatively displacing the first reseat component and the second reseat component on respective contact points between the first reseat component and the second reseat component while keeping contact between the movable component and the fixed component after the outside force is ceased to be applied to the movable component to finally return the movable component to the rest position, the displacement generator also serving as the drive source.

In the present invention, the circumferential shift can be corrected during the return movement even without the displacement generator by changing positions of both of the contact points on the fixed component and the movable component during, for instance, the minute slide movement in returning the movable component to the rest position. In this case, the drive source is a mechanism for returning the movable component to an initial posture.

Further, at least the first reseat component or the second reseat component may be rotated to change the positions of the contact points on both of the fixed component and the movable component without relatively displacing the fixed component and the movable component. In this case, the rotary mechanism serves as the drive source.

However, by providing the displacement generator for artificially causing relative displacement of the fixed component and the movable component after the return movement thereof, the circumferential shift can be corrected with high accuracy by a simple structure.

In the above, it is preferable that the displacement generator relatively displaces the respective fixed components and the respective movable components along only a single direction.

Though the above-described present invention can be implemented by providing piezoelectric elements for displacing in a plurality of different directions, the structure can be complicated. According to the above arrangement, the effect of the present invention can be achieved by providing only one displacement generator for each combination of the fixed component and movable component. Accordingly, the structure of the reseat system can be simplified without largely increasing production costs thereof.

DETAILED DESCRIPTION OF PREFERRED EMBODIMENTS

Figure 1:
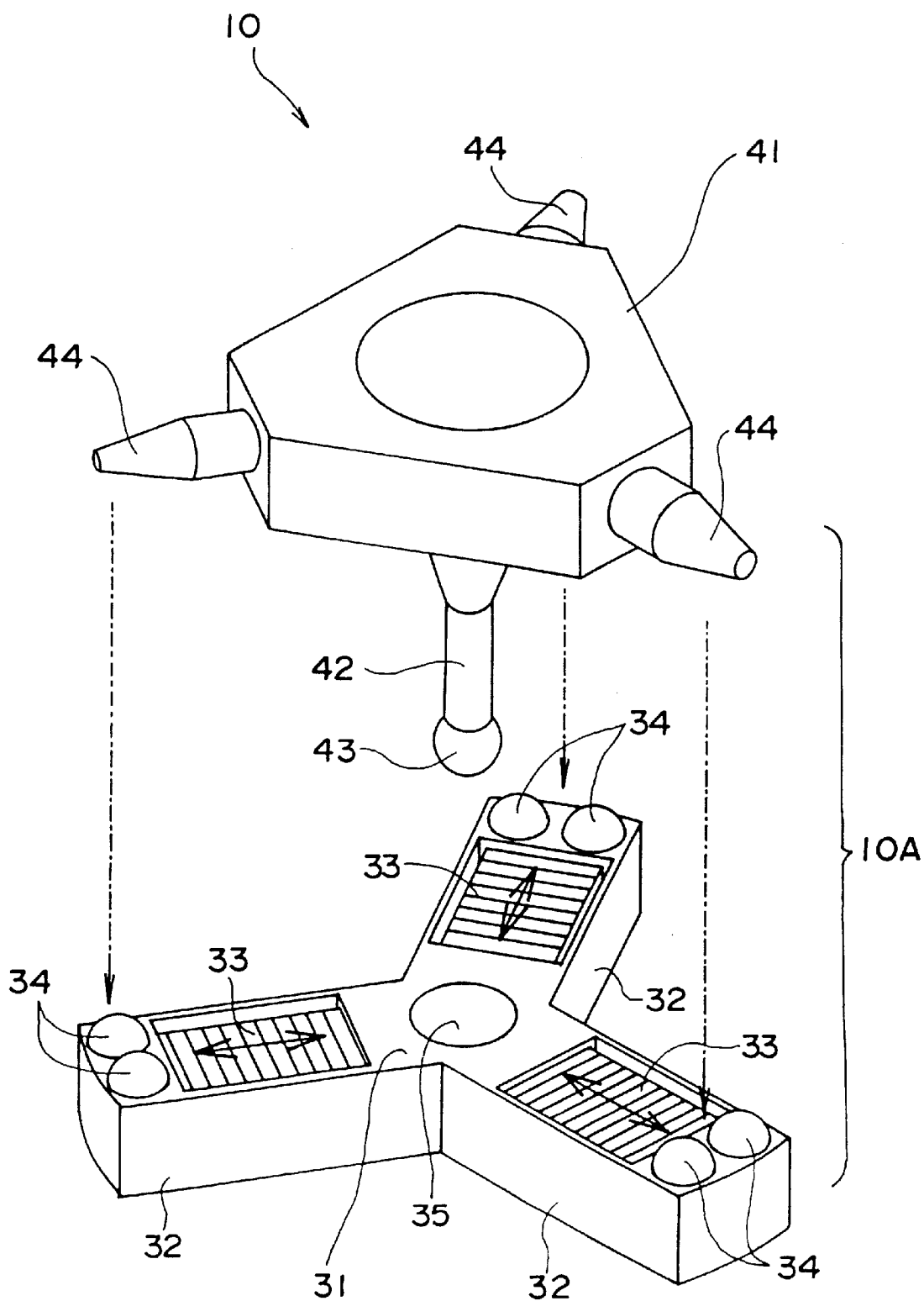
FIG. 1 is a perspective view showing a reseat system of a touch signal probe according to the first embodiment of the present invention.

An embodiment of the present invention will be described below with reference to the attached drawings. Incidentally, in the respective embodiments, the same reference numeral will be attached to the same component to omit or simplify description thereof.

First Embodiment

FIG. 1 shows a first embodiment of the present invention. The touch signal probe 10 of the first embodiment includes a fixed component 31, a movable component 41 having a stylus 42, and a reseat system 10A between the fixed component 31 and the movable component 41.

The fixed component 31 includes a base portion having a through hole 35 for the stylus 42 to be inserted, and three support arms 32 extending from the base portion at 120 degree intervals radially from the stylus axis. A pair of hard balls 34 is provided on the respective support arms 32 adjacent to the distal end thereof and, further, a piezoelectric element 33 for stretching and contracting the support arm by applying electric voltage between the hard balls 34 and the base portion is provided on the support arms 32.

In the above, the hard ball 34 constitutes a reseat component on the fixed component side and the piezoelectric element 33 constitutes a displacement generator of the present invention.

A contact ball 43 to be in contact with the workpiece is provided on a distal end of the stylus 42. Further, the movable component 41 has three cylindrical bodies 44 extending radially from an axis of the stylus 42 at 120 degree intervals and having an outer circumference with a more narrow pointed end than the base end thereof on a position corresponding to a center of the pair of hard balls 34. The cylindrical body 44 constitutes a reseat component on movable component side of the present invention.

In the above arrangement, when the contact ball 43 comes out of contact with the workpiece and the movable component 41 conducts return movement, the movable component 41 restores contact with the fixed component by virtue of the biasing force. At this time, in accordance with the contact and return movement, respective cylindrical bodies 44 slide in a direction approximately opposite to the contact point with the workpiece relative to the respective hard balls 34.

However, since each respective cylindrical body 44 has a tapered surface, the position of the contact points on both of the cylindrical body 44 and the hard ball 34 respectively move. Accordingly, the return effect on account of the biasing force is less likely to be hindered by the elastic deformation at the respective contact points, thus preventing the circumferential shift providing high accuracy.

After the above return movement, a displacement voltage is applied to the respective piezoelectric elements 33 to synchronously conduct the displacement movement.

When the displacement voltage is applied, the respective piezoelectric elements displace in an approximately radial direction relative to the axis of the stylus 42. The displacement at this time exceeds Hertzian elastic deformation. Incidentally, the "displacement" herein refers to a static displacement, which is different from "vibration" where minute movement by the piezoelectric element is repeated.

In accordance with the displacement, the hard balls 34 also displace respectively in the displacement direction of the piezoelectric element, thus conducting a relative slide movement between corresponding cylindrical bodies 44.

The respective hard ball 34 and the cylindrical body 44 relatively displace by the slide movement as shown in FIG. 2.

Figure 2A:
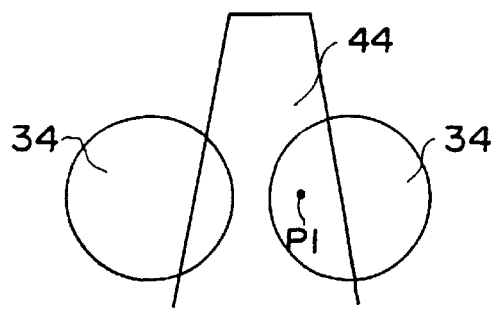
FIGS. 2(A) to (H) are illustrations for showing an effect of the first embodiment, where (A), (C), (E) and (G) are illustrations of relative displacement between cylindrical body 44 and hard ball 34 seen from a movable component side, and where (B), (D), (F) and (H) are end views showing cross sections perpendicular to displacement direction, the cross sections including the cylindrical body 44, the hard ball 34 and contact point thereof.
Figure 2B:
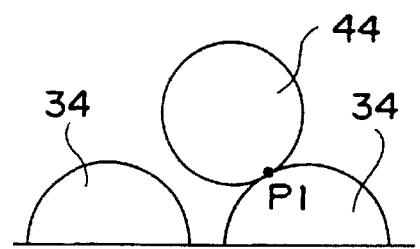
Figure 2C:
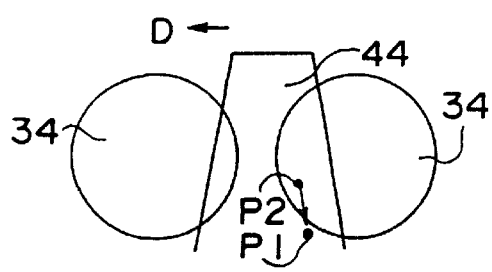

Specifically, as shown in FIG. 2(A), circumferential shift is caused immediately before the displacement voltage is applied to the respective piezoelectric elements 33 and the cylindrical body 44 is supported only by one of the pair of hard balls 34 (right side in the figure). At this time, as shown in FIG. 2(B), the cylindrical body 44 and one of the hard balls 34 is in contact with each other at contact point P1.

Figure 2D:
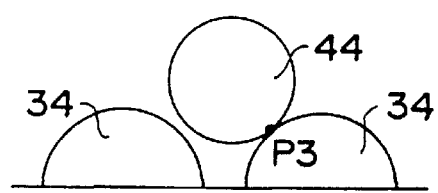
Figure 2E:
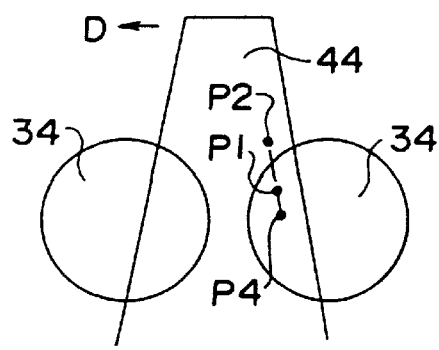

When the displacement voltage is applied to the respective piezoelectric elements 33 and the piezoelectric elements 33 are deformed to stretch from the base portion of the fixed component 31 to the hard ball 34, the cylindrical body 44 retreats relative to the hard ball 34 in the radial direction from the axis of the stylus. At this time, the contact point on the cylindrical body 44 moves from P1 to P2 in the figure by the relative retraction of the cylindrical body 44. Further, as shown in FIG. 2(D), the contact point P1 on the hard ball 34 side also moves to P3. This is because the tapered surface of the cylindrical body 44 slides in the circumferential direction (D direction in the figure) by virtue of the biasing force applied to the movable component 41. Incidentally, the other hard ball 34 (left in the figure) and the cylindrical body 44 may not be in contact with each other according to the magnitude of initial circumferential shift.

Figure 2F:
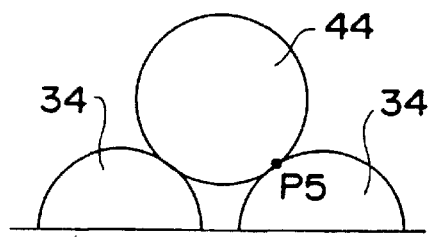

Subsequently, when the respective piezoelectric elements 33 deform to contract from the hard ball 34 side toward the base portion of the fixed component 31, the cylindrical body 44 projects in the radial direction of the axis of the stylus relative to the hard ball 34. At this time, the tapered surface of the cylindrical body 44 further slides in the D direction by the biasing force applied to the movable component 41, so that both the cylindrical body 44 and the pair of hard balls 34 touch each other. And the contact point on the cylindrical body 44 side moves from P2 to P4 in the figure by the relative retraction of the cylindrical body 44. Further, as shown in FIG. 2(F), the contact point P3 on the hard ball 34 side also moves to P5.

Figure 2G:
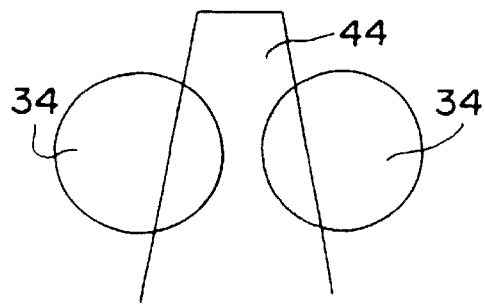
Figure 2H:
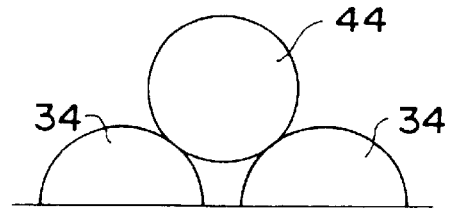

Subsequently, when the displacement voltage is no longer applied and the cylindrical body 44 and the hard ball 34 are settled, the cylindrical body 44 and the hard ball 34 are kept in contact with each other at two points as shown in FIGS. 2(G) and 2(H).

According to the present embodiment, the contact point on both of the cylindrical body 44 and the hard ball 34 respectively changes position thereof in accordance with relative slide movement of the cylindrical body 44 and the hard ball 34 by the piezoelectric element 33. Accordingly, the elastic deformation on the contact point of the cylindrical body 44 with the hard ball 34 does not restrict the cylindrical body 44 from sliding in a circumferential direction as well as in an axial direction. Therefore, the reseat shift error can be corrected by the displacement movement by the piezoelectric element 33 with high accuracy.

Further, since the cylindrical body 44 has a tapered surface having a more narrow end than the base thereof, the cylindrical body 44 moves to correct the circumferential shift by the function of the biasing force during the relative slide movement by the piezoelectric element 33. Accordingly, further accurate correction of the reseat shift error is possible by employing a piezoelectric element 33 capable of displacing in only one direction. Further, since the same arrangement as the conventional products can be used except for the cylindrical body 44, the manufacturing process and facility can also be used for manufacturing the present product, thus not increasing the production cost.

Second Embodiment

Figure 3:
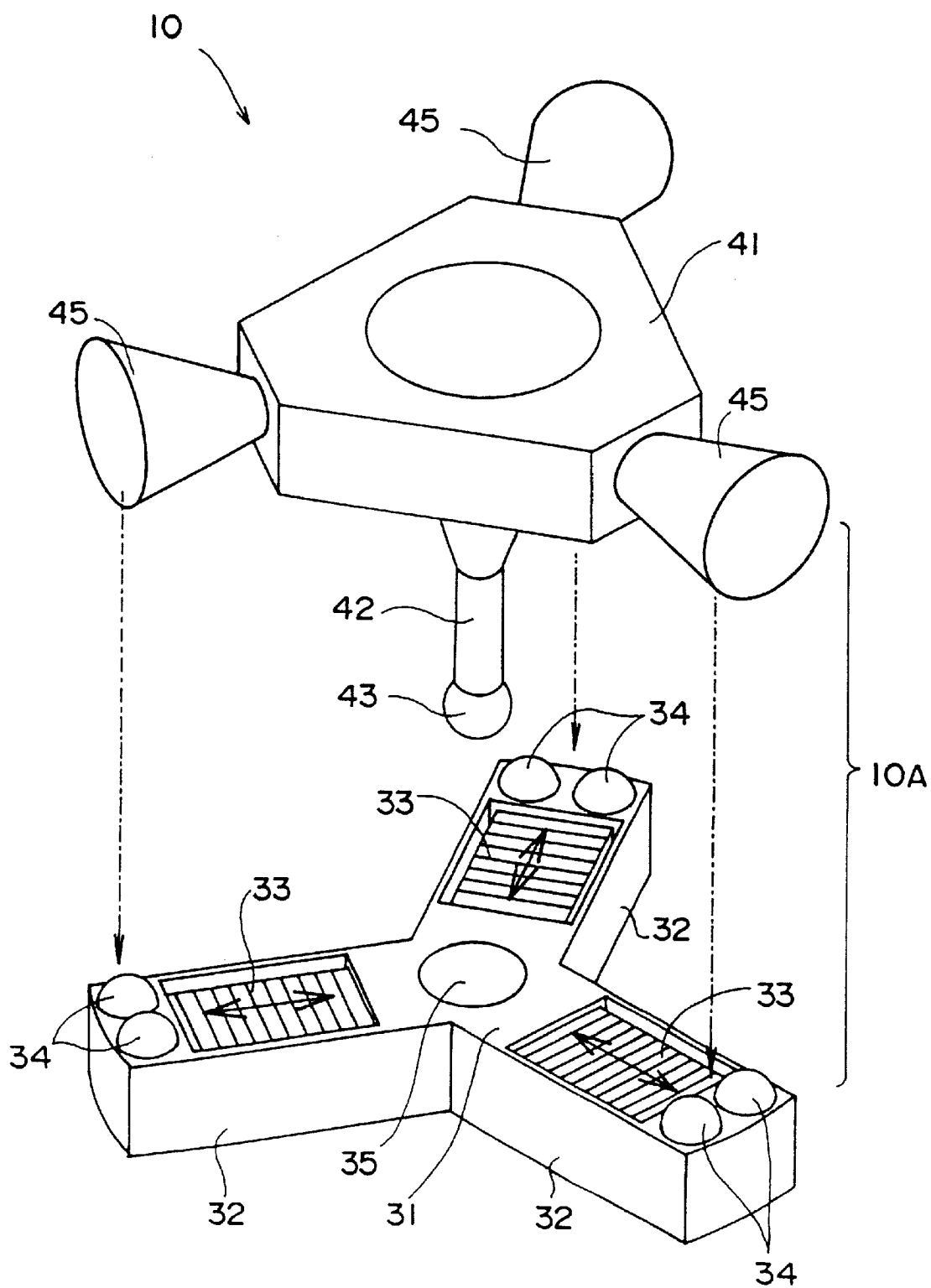
FIG. 3 is a perspective view showing a reseat system of a touch signal probe according to the second embodiment of the present invention.

FIG. 3 shows a second embodiment of the present invention. The present invention differs from the above-described first embodiment in that a reversely tapered cylindrical body 45 with a so-called reverse tapered surface having a wider distal end than the base end is used as the reseat component on the movable component side instead of the cylindrical body 44 of the first embodiment.

In the present embodiment, the contact point on both the reverse cylindrical body 45 and the hard ball 34 also moves while changing position thereof on respective components on account of outer circumferential tapered surface of the reverse tapered cylindrical body 45 as the reseat component on movable component side.

Accordingly, the same effect as mentioned in the first embodiment can be attained.

Third Embodiment

Figure 4:
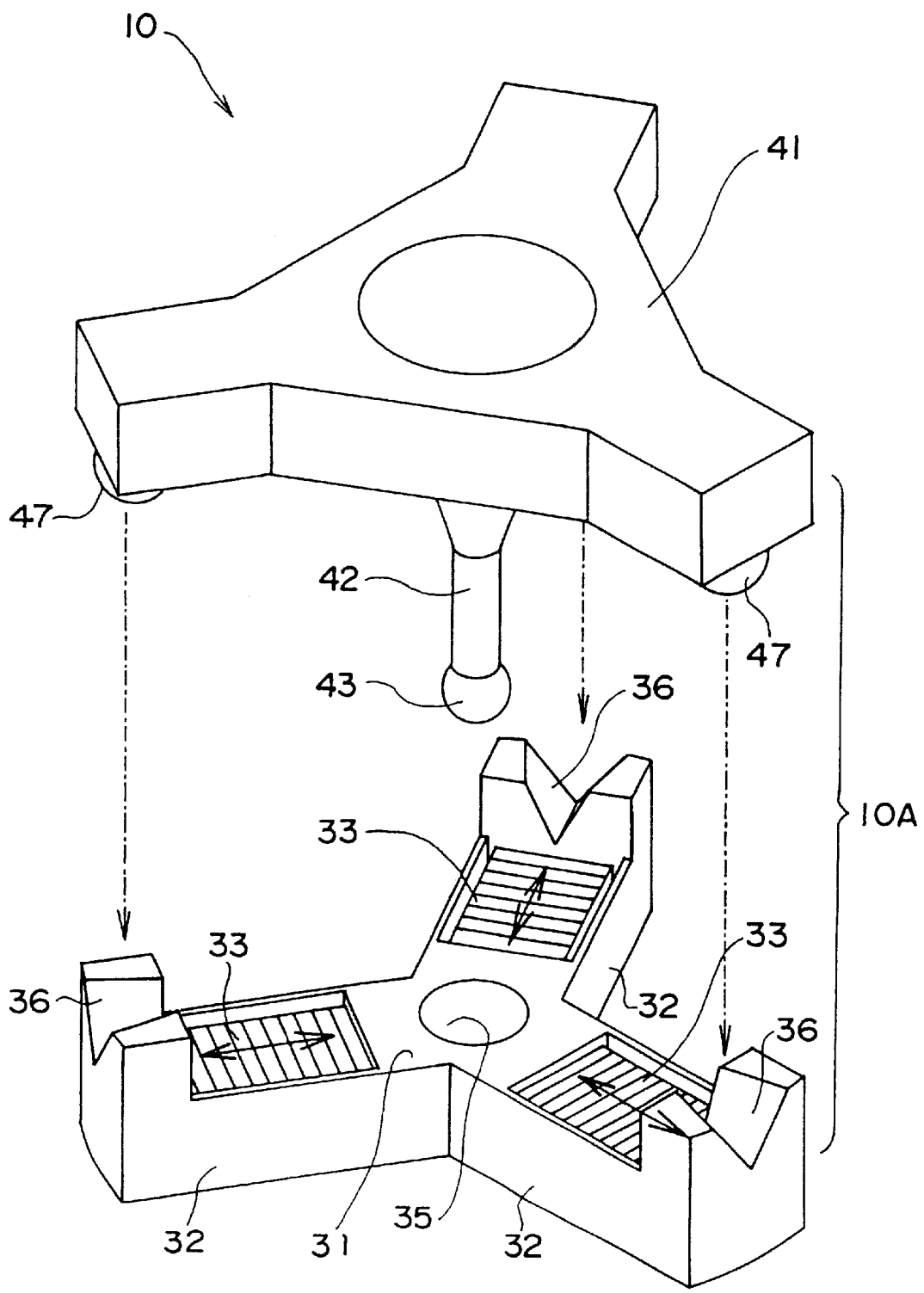
FIG. 4 is a perspective view showing a reseat system of a touch signal probe according to the third embodiment of the present invention.
Figure 5:
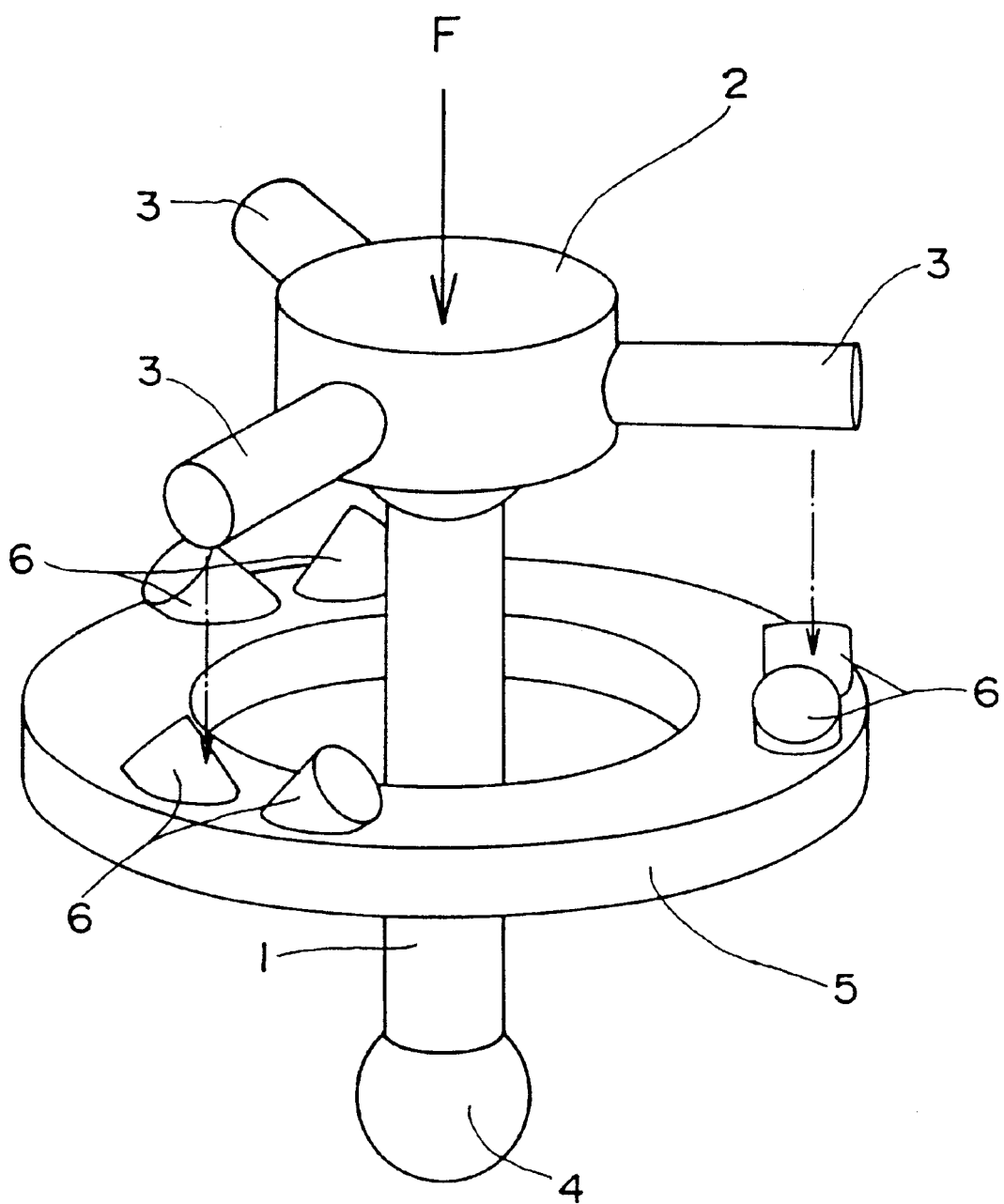
FIG. 5 is a perspective view showing a reseat system of a conventional reseat system of a touch signal probe.
Figure 6A:
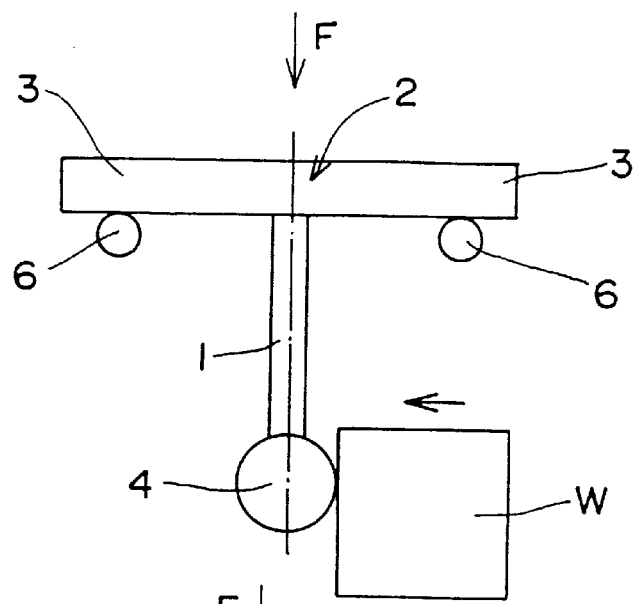
FIG. 6 is an illustration of problems associated with the conventional reseat system of a touch signal probe.
Figure 6B:
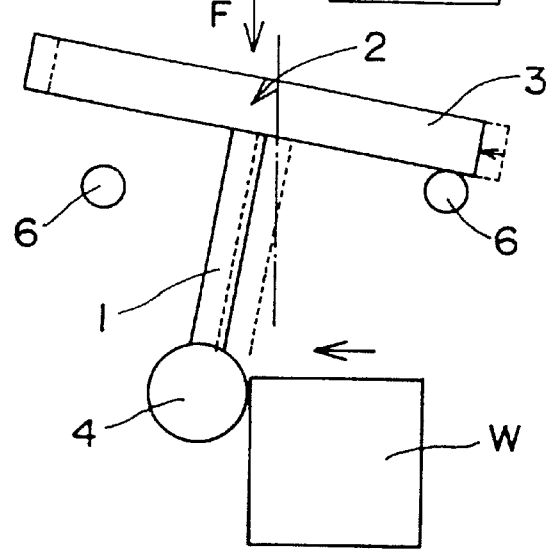
Figure 6C:
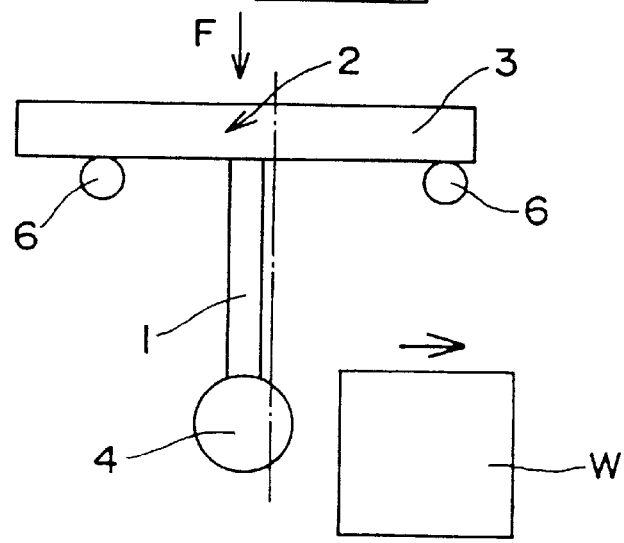
Figure 7:
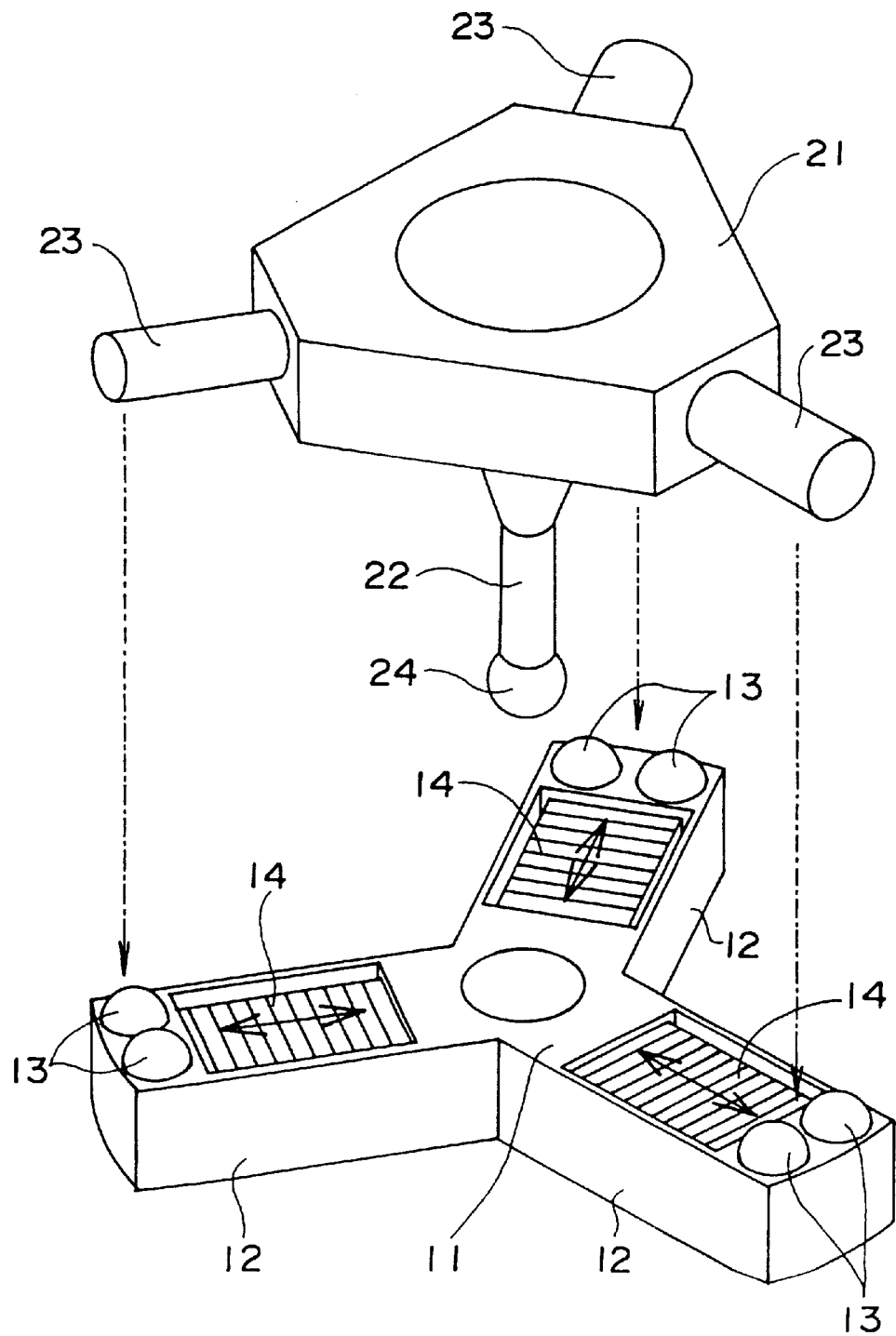
FIG. 7 is a perspective view showing a conventional reseat system having a displacement generator.
Figure 8A:
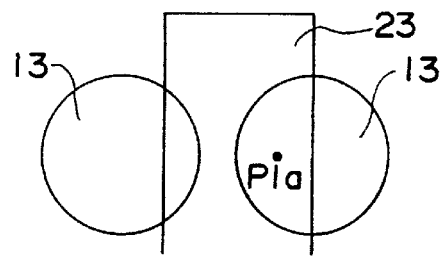
FIGS. 8 (A) to (H) are illustrations of problems associated with the conventional reseat system having the displacement generator, where (A), (C), (E) and (G) are illustrations of relative displacement between cylindrical body 23 and hard ball 13 seen from a movable component side, and where (B), (D), (F) and (H) are end views showing cross sections perpendicular to displacement direction, the cross section including the cylindrical body 23, the hard ball 13 and contact point thereof.
Figure 8B:
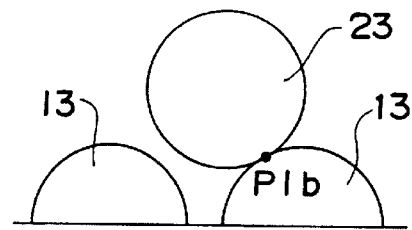
Figure 8C:
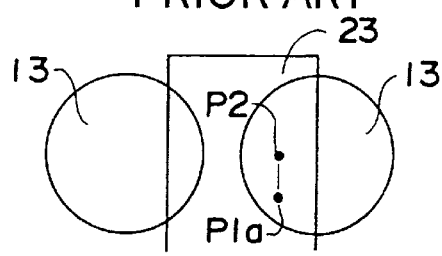
Figure 8D:
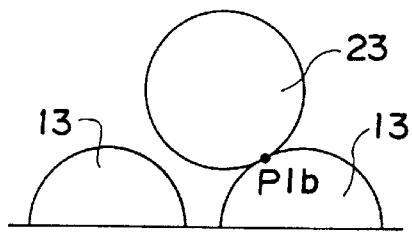
Figure 8E:
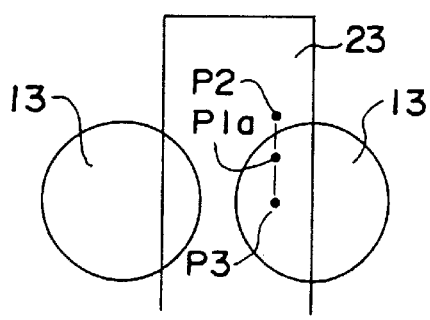
Figure 8F:
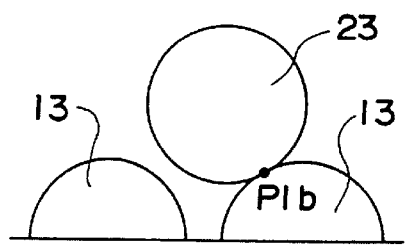
Figure 8G:
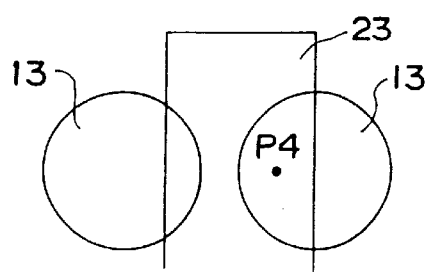
Figure 8H:
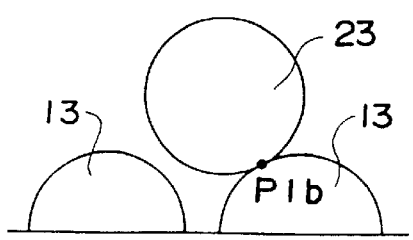

FIG. 4 shows a third embodiment of the present invention. In the present embodiment, a single hard ball 47 provided on a surface of the movable component facing the fixed component is used as the reseat component on the movable component side.

And a V-shape groove 36 provided on a projection projecting from a distal end of the support arm 32 and having a cut surface slanting relative to displacement direction by the piezoelectric element 33 is used as the reseat component on the fixed component side.

In the present embodiment, since the cut surface of the V-shape groove 36 is slanted in the radial direction of the axis of the stylus 42, the contact points on the hard ball 47 side and the V-shape groove 36 side respectively change the position thereof.

Accordingly, the force for preventing correction of the reseat shift error of the movable component is not generated by the elastic deformation on respective contact points, so that the reseat shift error can be corrected with high accuracy.

Further, since the V-shape groove 36 has the cut surface slanting relative to the displacement direction by the piezoelectric element 33, the hard ball 47 moves to correct the circumferential shift by the effect of the biasing force during the relative slide movement by the piezoelectric element 33. Accordingly, further accurate correction of the reseat shift error is possible by employing the piezoelectric element 33 displacing along only one direction.

The scope of the present invention is not restricted to the aforesaid embodiments, but includes following modifications as long as an object of the present invention can be attained.

The configuration of the movable component according to the present invention is not limited to the configuration mentioned in the aforesaid embodiments, but may be a disk having a diameter identical with or larger than length of the support arm of the fixed component 31 or may be polygon such as a triangle. Further, the configuration of the fixed component 31 is not restricted to the above arrangement of a small base portion having the support arm, but may be a polygon such as a triangle having a through hole at the center thereof. In short, any configuration is possible for the fixed component and the movable component as long as the reseat component on the movable component side can be supported to correspond to the reseat component on the fixed component side.

Though a pair of hard balls is used for the reseat component on the fixed component side in the aforesaid first and the second embodiment, a pair of cylinders arranged in V-shape may be used instead thereof. Though the hardball 47 is used as the reseat component on movable component side and the V-shape groove 36 is used as the reseat component on the fixed component side in the third embodiment, the combination of the reseat component on movable component side and the reseat component on fixed component side may be a pair of hard balls and a projection having a cross section such as a V-shape. Alternatively, the combination of the reseat component on movable component side and reseat component on fixed component side may be one hard ball and a wedge-shape groove having a bottom base line slanting toward the biasing force direction moving away from the axis of the stylus.

In short, the scope of the present invention includes all of the arrangements where both of the position of the contact point on the fixed component side and the position of the contact point on the movable component side respectively changes during relative displacement of the fixed component and the movable component.

In the above-described embodiments, a displacement generator using a piezoelectric element for displacing in an approximately radial direction relative to the axis of the stylus is used as the drive source. However, the drive source of the present invention is not restricted to the displacement generator. For instance, the slide movement mechanism during return movement of the movable component after being in contact with the workpiece may be used as the drive source, or alternatively, a rotating mechanism for rotating the reseat component on movable component side and reseat component on fixed component side without displacement may be used.

Further, when the displacement generator is used in the present invention, the displacement generator is not restricted to the piezoelectric element. For instance, an excitation coil may be used, or alternatively, other drive means such as electrostatic, air-pressure and hydraulic pressure mechanism may be used.

Further, the displacement direction is not restricted to the approximate radial direction relative to the axis of the stylus, but may be a direction perpendicular to the parallel line of the stylus axis. For instance, the displacement generator may be disposed between the pair of hard balls in the first embodiment. Further, though one displacement generator is used for each combination of the reseat component on the movable component side and the reseat component on the fixed component side, a plurality of displacement generators may be used for each combination. Further, though the displacement generator is provided to the fixed component side, the displacement generator may be provided to the movable component side.

In other words, any arrangement is possible for the displacement generator as long as relative displacement can be caused between the reseat component on the movable component side and the reseat component on the fixed component side.

What is claimed is:

1. A reseat system of a touch signal probe, comprising:
   a fixed component;
   a movable component having a stylus;
   a first reseat component provided on the fixed component;
   a second reseat component provided on the movable component, the second reseat component touching the first reseat component at a pair of contact points on three locations mutually spaced apart, the reseat system of a touch signal probe allowing displacement of the movable component relative to the fixed component when an outside force is applied to the stylus and returning the movable component to a rest position when the outside force is not applied to the stylus by virtue of a biasing force; and
   a contact point displacer for relatively displacing the first and second reseat components,
   said first and second reseat components configured such that the contact point displacer moves the contact point on both the fixed component and the contact point on the movable component at least a predetermined distance.

2. The reseat system of a touch signal probe according to claim 1, wherein the predetermined distance is larger than Hertzian elastic deformation caused on the contact points on the fixed component and the movable component.

3. The reseat system of a touch signal probe according to claim 1, wherein the contact point displacer comprises:
   a curved surface formed on one of the first reseat component and the second reseat component;
   a slant surface formed on the other of the first reseat component arid the second reseat component, the slant surface slanting relative to a radial direction of an axis of the stylus; and
   a drive source for relatively displacing the first reseat component and the second reseat component.

4. The reseat system of a touch probe according to claim 3, wherein one of the first reseat component and the second reseat component is a pair of hard balls and the other is a cylindrical body having conic outer circumference.

5. The reseat system of a touch signal probe according to claim 3, wherein one of the first reseat component and the second reseat component is a pair of cylindrical bodies arranged in a V-shape and the other is a cylindrical body having conic outer circumference.

6. The reseat system of a touch signal probe according to claim 3, wherein one of the first reseat component and the second reseat component is one hard ball and the other is a V-shape groove having a cut surface slanting relative to the radial direction of the axis of the stylus.

7. The reseat system of a touch signal probe according to claim 3, wherein the contact point displacer includes a displacement generator for relatively displacing the first reseat component and the second reseat component on respective contact points between the first component and the second reseat component on respective contact points between the first reseat component and the second reseat component while keeping contact between the movable component and the fixed component after an outside force is ceased to be applied to the movable component to finally return the movable component to the rest position, the displacement generator also serving as the drive source.

8. The reseat system of a touch signal probe according to claim 7, wherein the displacement generator relatively displaces the respective fixed components and the respective movable components along only a single direction.

9. The reseat system of a touch signal probe according to claim 7, wherein one of the first reseat component and the second reseat component is a pair of hard balls and the other is a cylindrical body having conic outer circumference.

10. The reseat system of a touch signal probe according to claim 7, wherein one of the first reseat component and the second reseat component is a pair of cylindrical bodies arranged in V-shape and the other is a cylindrical body having conic outer circumference.

11. The reseat system of a touch signal probe according to claim 7, wherein one of the first reseat component and the second reseat component is one hard ball and the other is a V-shape groove having cut surface slanting relative to the radial direction of the axis of the stylus.

* * * * *